(12) United States Patent
Britton et al.

(10) Patent No.: US 6,654,814 B1
(45) Date of Patent: Nov. 25, 2003

(54) SYSTEMS, METHODS AND COMPUTER PROGRAM PRODUCTS FOR DYNAMIC PLACEMENT OF WEB CONTENT TAILORING

(75) Inventors: Kathryn H. Britton, Chapel Hill, NC (US); Owen H. Choi, Raleigh, NC (US); Richard A. Floyd, Chapel Hill, NC (US); Kent F. Hayes, Jr., Chapel Hill, NC (US); Carl S. Kessler, Raleigh, NC (US); Brent A. Miller, Cary, NC (US); Brad B. Topol, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,544

(22) Filed: Jan. 26, 1999

(51) Int. Cl.[7] .............................................. G06F 15/16
(52) U.S. Cl. ........................ 709/246; 709/201; 709/203
(58) Field of Search ................................ 709/217, 206, 709/203, 201, 218, 246, 223, 226, 225, 228; 707/10, 103

(56) References Cited

U.S. PATENT DOCUMENTS 5,706,434 A * 1/1998 Kremen ...................... 709/218
5,717,923 A * 2/1998 Dedrick ...................... 707/102

(List continued on next page.)

FOREIGN PATENT DOCUMENTS

| JP | 09237233 | 9/1997 |
|----|----------|--------|
| JP | 09305472 | 11/1997 |
| JP | 09321803 | 12/1997 |
| JP | 10021165 | 1/1998 |
| JP | 10124430 | 5/1998 |
| JP | 10124518 | 5/1998 |
| JP | 10133973 | 5/1998 |
| JP | 10171731 | 6/1998 |
| JP | 10171822 | 6/1998 |
| JP | 10243048 | 9/1998 |
| JP | 10269160 | 9/1998 |
| JP | 10327200 | 12/1998 |
| WO | WO97/14244 | 4/1997 |
| WO | WO 97/29423 | 8/1997 |
| WO | WO97/42584 | 11/1997 |
| WO | WO98/15091 | 4/1998 |
| WO | WO98/38759 | 9/1998 |

OTHER PUBLICATIONS

International Search Report dated Jul. 27, 2000; International Application No. PCT/GB96/02983.
ProxiNet, ProxiNet, Inc. Debuts ProxiWeb for Windows CE, http://www.proxinet.com/press/n_and_r/PR980918.html, Sep. 18, 1998 (© 1998 ProxiNet, Inc.).

(List continued on next page.)

*Primary Examiner*—Krisna Lim
*Assistant Examiner*—Kim Flynn
(74) *Attorney, Agent, or Firm*—Myers Bigel Sibley & Sajovec, P.A.; Jeanine S. Ray-Yarletts

(57) ABSTRACT

Methods, systems and computer program products are provided for tailoring content for a session of a first data processing system communicating with a second data processing system by obtaining session specific information from the first data processing system and distributing tailoring functions between the first data processing system and the second data processing systems based upon the obtained session specific information. In particular, policies which control the distribution of tailoring functions between data processing systems based on session specific information may be obtained from a repository and tailoring functions distributed between the first data processing system and the second data processing system according to the obtained policies and the session specific information.

46 Claims, 5 Drawing Sheets

U.S. PATENT DOCUMENTS

| | | | | |
|---|---|---|---|---|
| 5,727,159 A | * | 3/1998 | Kikinis | 709/246 |
| 5,727,950 A | | 3/1998 | Cook et al. | 434/350 |
| 5,737,592 A | | 4/1998 | Nguyen et al. | 395/604 |
| 5,754,772 A | | 5/1998 | Leaf | 395/200.33 |
| 5,764,235 A | * | 6/1998 | Hunt et al. | 345/428 |
| 5,790,790 A | | 8/1998 | Smith et al. | 395/200.36 |
| 5,848,415 A | * | 12/1998 | Guck | 707/10 |
| 5,908,469 A | | 6/1999 | Botz et al. | 713/201 |
| 5,911,776 A | * | 6/1999 | Guck | 709/217 |
| 6,035,339 A | * | 3/2000 | Agraharam et al. | 709/246 |
| 6,065,059 A | * | 5/2000 | Shieh et al. | 709/233 |
| 6,081,265 A | * | 6/2000 | Nakayama et al. | 345/746 |
| 6,105,063 A | * | 8/2000 | Hayes, Jr. | 709/223 |
| 6,128,663 A | * | 10/2000 | Thomas | 709/228 |
| 6,185,625 B1 | * | 2/2001 | Tso et al. | 709/247 |
| 6,195,677 B1 | * | 2/2001 | Utsami | 709/201 |
| 6,212,550 B1 | * | 4/2001 | Segur | 709/206 |
| 6,243,392 B1 | * | 6/2001 | Uemura et al. | 370/465 |
| 6,243,761 B1 | * | 6/2001 | Mogul et al. | 709/246 |
| 6,253,246 B1 | * | 6/2001 | Nakatsuyama | 709/233 |
| 6,285,889 B1 | * | 9/2001 | Nykanen | 455/557 |
| 6,286,043 B1 | * | 9/2001 | Cuomo et al. | 709/223 |
| 6,310,601 B1 | * | 10/2001 | Moore et al. | 345/660 |
| 6,317,795 B1 | * | 11/2001 | Malkin et al. | 709/246 |
| 6,429,879 B1 | * | 8/2002 | Sturgeon et al. | 345/723 |
| 6,490,624 B1 | * | 12/2002 | Sampson et al. | 709/227 |
| 6,493,704 B1 | * | 12/2002 | Hichwa et al. | 707/3 |
| 6,501,472 B1 | * | 12/2002 | Hunt et al. | 345/428 |

OTHER PUBLICATIONS

Wolf et al., "Method For Targeted Advertising On The World Wide Web," U.S. patent application Ser. No. 08/829,631, filed Mar. 31, 1997.

Chen et al., "Multi–Agents Based Dynamic Request Placement Strategies in Distributed Information Systems," Proceedings of the ISCA International Conference. Parallel and Distributed Computing Systems, Pt. vol. 2, 1996.

Krishnan et al., "Service Aggregation Through Rate Adaptation Using a Single Storage Format," Proc. 7th Intl. Workshop on Network and Operating System Support for Digital Audio and Video, May, 1997.

* cited by examiner

SYSTEMS, METHODS AND COMPUTER PROGRAM PRODUCTS FOR DYNAMIC PLACEMENT OF WEB CONTENT TAILORING

FIELD OF THE INVENTION

The present invention relates generally to web content and, more particularly, to the transfer and presentation of web content among data processing systems.

BACKGROUND OF THE INVENTION

The Internet is a worldwide decentralized network of computers having the ability to communicate with each other. The Internet has gained broad recognition as a viable medium for communicating and interacting across multiple networks. The World Wide Web (Web) was created in the early 1990's, and is composed of server-hosting computers (web servers) connected to the Internet that have hypertext documents or web pages stored therewithin. Web pages are accessible by client programs (i.e., web browsers) utilizing the Hypertext Transfer Protocol (HTTP) via a Transmission Control Protocol/Internet Protocol (TCP/IP) connection between a client-hosting device and a server-hosting device.

An intranet is a private computer network conventionally contained within an enterprise and that conventionally includes one or more servers in communication with multiple user computers. An intranet may be composed of interlinked local area networks and may also use leased lines in a wide-area network. An intranet may or may not include connections to the outside Internet. Intranets conventionally utilize various Internet protocols and, in general, often look like private versions of the Internet. An intranet user conventionally accesses an intranet server via a web browser running locally on his/her computer.

Exemplary web browsers for both Internet and intranet use include Netscape Navigator (Netscape Communications Corporation, Mountain View, Calif.) and Internet Explorer (Microsoft Corporation, Redmond, Wash.). Web browsers typically provide a graphical user interface for retrieving and viewing information, applications and other resources hosted by Internet/intranet servers (hereinafter collectively referred to as "web servers" or "web sites").

Web content including, but not limited to, information, applications, applets and other video and audio resources (collectively referred to herein as "files") are conventionally delivered from a web server to a web browser on a user's computer in the form of web pages. As is known to those skilled in this art, a web page is conventionally formatted via a standard page description language such as HyperText Markup Language (HTML) or Extensible Markup Language (XML), and typically displays text and graphics, and can play sound, animation, and video data. HTML and XML provide basic document formatting and allow a web content provider to specify hypertext links (typically manifested as highlighted text) to other servers and files. When a user selects a particular hypertext link, a web browser reads and interprets the address, called a Uniform Resource Locator (URL) associated with the link, connects the web browser with the web server at that address, and makes an HTTP request for the file identified in the link. The web server then sends the requested file to the client in the format of the requested file (e.g. HTML, XML, GIF, JPEG, etc) which the browser interprets and displays to the user.

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Hand-held computing devices including, but not limited to, PDAs, cellular telephones, and computing devices utilized within appliances and automobiles, are often collectively referred to as "pervasive" computing devices. Many hand-held computing devices utilize the Microsoft Windows CE and 3Com Palm Computing platforms as well as web browsers such as HandWeb from SmartCode, Inc. and the Pocket Internet Explorer from Microsoft, Inc.

Unfortunately, hand-held computing devices may have limited functionality in comparison to desktop computers for which much web content has been developed. For example, hand-held devices may be voice only, may have limited processing capabilities, limited memory, black and white displays or may have displays that are small in size compared with desktop computer displays. As a result, images and text otherwise displayable on a desktop computer display may not be displayable on a hand-held computing device display or may be impractical or otherwise undesirable to display on a hand-held computing device. For example, a desktop computer display having an array of 1024 pixels by 768 pixels may be able to display a large (e.g., 2 megabit), 24 bit per pixel image. A hand-held computing device with a display having an array of 120 pixels by 120 pixels and with the ability to display only a few bits per pixel, may ignore much of the image data. As a result the image may not be displayed properly, if at all, via the hand-held computing device display. Furthermore, text within a file may have a particular font or size that can hinder the display thereof within a hand-held computing device display.

Files that may not be displayable via a hand-held computing device display can typically be transformed into a format that is displayable within a hand-held computing device display. For example, large, high resolution, color images can be transformed into small, black and white images that can be displayed within small, low resolution displays. Furthermore, because some web servers can recognize the type of client device requesting a file, files in the proper format for display via the requesting client device can be provided.

Furthermore, these pervasive computing devices may be connected to a network, such as the Internet or an intranet, through different communication methods. For example, the same pervasive computing device may be connected to a network via a direct Local Area Network (LAN) connection such as through a network interface card (NIC) during one session and then in a subsequent session be connected over a wireless communication link, such as over a cellular telephone. These differing connection methods may have substantially differing properties which may impact on the form of content provided to the pervasive computing device. Thus, the LAN connection provide low cost and short delays for acquiring and rendering information while the wireless communication link may be at a higher cost with longer delays. Thus, a form of content which may be acceptable for the LAN connection may be unacceptable for the wireless communication link.

Similarly, other performance issues, which may change from session to session or during a session, may also impact on the transformation or "tailoring" of content for pervasive computing devices. Thus, for example, the expected duration of the connection, congestion on the communication link or network or the content provided to the pervasive computing device may all impact on the type of tailoring of content to be performed.

Conventionally, this tailoring of content has been performed either at the server providing the content to the pervasive computing device or at the pervasive computing device. See for example, ProxiWeb browser and proxy from Proxinet, Inc., and U.S. Pat. No. 5,764,235. However, such an arbitrary allocation of tailoring functions may result in performance degradation to the server, the pervasive computing device or the network through which these devices communicate. Thus, a need exists for improvements in the tailoring of content for pervasive computing devices to better exploit the resources available to such devices.

SUMMARY OF THE INVENTION

In view of the above discussion, it is an object of the present invention to provide improved tailoring of content for data processing systems, such as pervasive computing devices.

A further object of the present invention is to provide for the improved tailoring of content without requiring modification of existing browsers or servers.

Still another object of the present invention is to provide content tailoring without requiring user intervention in each instance.

These and other objects of the present invention are provided by methods, systems and computer program products for tailoring content for a session (i.e. a period of time where the operating environment of a data processing is not expected to change) of a first data processing system (such as a client) communicating with a second data processing system (such as a server or proxy) by obtaining session specific information from the first data processing system and distributing tailoring functions between the first data processing system and the second data processing system based upon the obtained session specific information. In particular, policies which control the distribution of tailoring functions between data processing systems based on session specific information may be obtained from a repository and tailoring functions distributed between the first data processing system and the second data processing system according to the obtained policies and the session specific information.

An ability to modify the location of content tailoring dynamically allows for the ability to respond to changes in server availability, network conditions, connection types, information presentation characteristics, device types, user preferences and organizational policies. By distributing the tailoring of content provided to a data processing system, such as a pervasive computing device, based on session specific information, the location of the content tailoring may be established based on particular characteristics of a session. The location of content tailoring may be determined to take advantage of the characteristics of a session to provide improvement in the tailoring of content. By basing the distribution of the content tailoring functions on session specific information and established policies, both the concerns of a particular user as well as the overall concerns of network management may be taken into account in tailoring content to be provided to a data processing system. Thus, in a particular instance, the location of content tailoring functions may be divided so as to provide improved tailoring performance to an individual user while maintaining network performance for other users.

In particular embodiment of the present invention, the policies which control the distribution of tailoring functions between data processing systems are defined and stored in a policy repository accessible to the second data processing system. In such a case, the policies are obtained from the policy repository.

In a further embodiment of the present invention, user preferences associated with the distribution of content tailoring functions between the first data processing system and data processing systems other than the first data processing system are stored in a preferences repository accessible to the second data processing system. The stored user preferences associated with a user of the first data processing system are obtained from the preferences repository and the session information, the obtained policies and the obtained user preferences are coalesced so as to define a content tailoring distribution for the session. The tailoring functions are then distributed between the first data processing system and the second data processing system according to the defined content tailoring distribution for the session.

By providing the policies and user preferences in repositories, the policies and user preferences become "portable" in that a user who has access to the second data processing system may take advantage of the policy based distribution of tailoring functions irrespective of the physical location of the user and the particular device being used by the user. Furthermore, by coalescing the information, preferences may be tailored for a particular session, thus providing further portability of content tailoring distribution from device to device and session to session. A user may have defined user default preferences which are stored in the repository and are overridden based on the particular characteristics of a device being used by the user. For example, a user may have preferences established for a desktop workstation which are overridden when the user logs on using a PDA. Thus, the present invention may provide flexibility without requiring user intervention on a case by case basis.

In yet another embodiment of the present invention, the session specific information may include information associated with a preference of the first data processing system as to the allocation of content tailoring functions between the first data processing system and data processing systems other than the first data processing system. The session specific information may also include an identification associated with a user of the first data processing system, hardware configuration information associated with the first data processing system, application information associated with an application executing on the first data processing system and/or operating system information associated with an operating system executing on the first data processing system.

In yet another embodiment of the present invention, content to be provided to the first data processing system is tailored at the second data processing system according to a first content tailoring function specified by the obtained policies and the session specific information so as to provide first tailored content. The first tailored content is then provided to the first data processing system. The first tailored content provided to the first data processing system may be further tailored at the first data processing system according to a second content tailoring function specified by the obtained policies and the session specific information so as to provide final tailored content for data presentation.

In another embodiment of the present invention, content provided to a first data processing system communicating with a second data processing system is tailored by transmitting a request for content from the first data processing system to the second data processing system. The request for content provides information associated with the tailoring of content to be provided to the first data processing system. In response to receiving the request from the first data processing system at the second data processing system, policies associated with the tailoring of content provided to the first data processing system are obtained. The policies are associated with defining the distribution of functions for tailoring content to be provided to the first data processing system between the first data processing system and at least one data processing system other than the first data processing system. The content requested by the received request is obtained and tailored utilizing a first tailoring operation at the data processing system other than the first data processing system. The first tailoring operation is based on the obtained policies and the information provided by the request. The tailored content is provided to the first data processing system and further tailored at the first data processing system based on the obtained policies and the information provided in the request.

By making the distribution of content tailoring functions responsive to requests from the first data processing system, particular embodiments of the present invention allow for a client-server paradigm. In such a paradigm, the present invention may take the form of a proxy or proxies which may be transparent to the application or users initially generating the requests and to the server or servers responding to the requests. Thus, the present invention provides for the distribution of content tailoring functions without requiring modifications to existing applications.

In a further embodiment of the present invention, the information associated with the tailoring of content includes a user identification associated with a user of the first data processing system. User preferences associated with the distribution of content tailoring functions between the first data processing system and data processing systems other than the first data processing system are stored in a preferences repository accessible to the second data processing system. The stored user preferences associated with the user of the first data processing system are then obtained from the preferences repository and the obtained content tailored utilizing a first tailoring operation based on the obtained policies, the obtained stored user preferences and the information provided by the request. Furthermore, the user preferences received from the first data processing system may be coalesced with the obtained policies and/or the obtained user preferences so as to define a content tailoring distribution for the first data processing system.

In a further embodiment of the present invention, client content tailoring information may be incorporated into the tailored content to be provided to the first data processing system. The content provided to the first data processing system is then tailored at the first data processing system based on the client content tailoring information. Furthermore, the client content tailoring information may specify a software program associated with the tailoring of content by the first data processing system. The first data processing system may then obtain the software program specified by the client content tailoring information and execute the software program at the first data processing system to further tailor the content.

In a particularly preferred embodiment of the present invention, the first data processing system is a pervasive computing device.

As will be appreciated by those of skill in the art, the present invention may be provided as a method, system or apparatus, and/or computer program product.

DETAILED DESCRIPTION OF THE INVENTION

Figure 1:
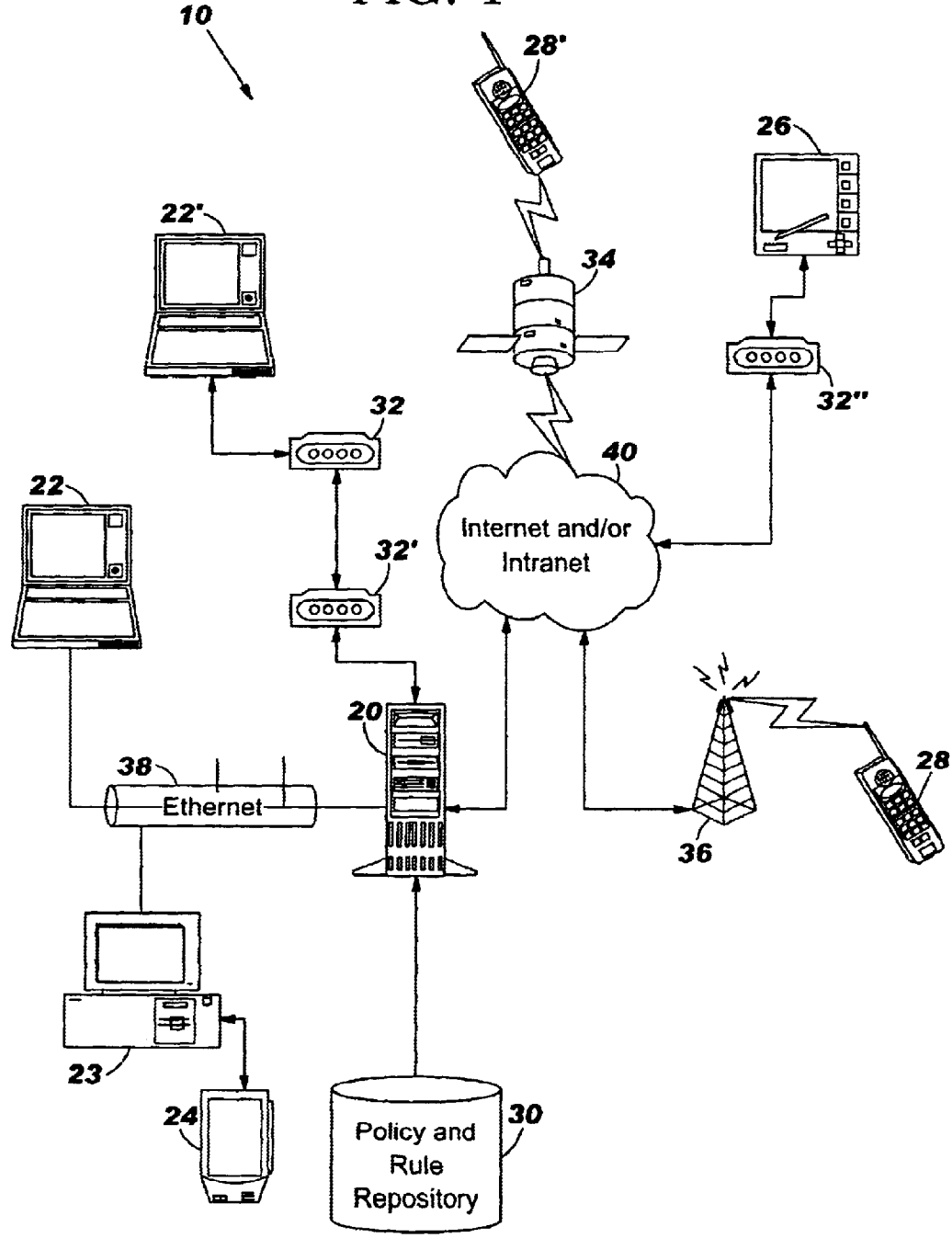
FIG. 1 is a diagram of a system which may utilize the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As is described in more detail below, the present invention allows for the distribution of content tailoring functions between a first processor such as a pervasive computing device and other processors based on policies and information about the session of the first processor. As used herein, the term session refers to a period of time where the operating environment of a remote processor connected to a network or server is not expected to change. Thus, for example, if the policies controlling the distribution of content tailoring functions for a session relate to the network connection of the session and the type of hardware device connected to the session, then the session may be considered to start with connection to the network and end with disconnect. Similarly, if the control of the distribution of content tailoring functions for a session utilizes policies further based on the user identification of a user logged on to the network or server, then the session may be considered to start when the user logs on and end when the user logs off. In an even finer granularity, if the policies controlling the distribution of content tailoring functions for a session are further based on the characteristics of an application, then the session may be considered to start when the application is invoked and end when the application is terminated. Thus, as can be seen from the above discussion, the concept of a session may vary depending on the particular policies or rules utilized and, further, multiple sessions may concurrently occur if multiple policies control differing aspects of user activity with respect to the network or server.

The present invention utilizes policies or rules to control the distribution of content tailoring functions between the mobile or pervasive computing device and devices to which the pervasive computing device is connected. Thus, for differing sessions of the pervasive computing device the processing system which performs all or some portion of the content modification for the pervasive computing device may be varied so as to take advantage of the particular characteristics of the session. The types of information typically utilized to control a session may include the type of network connection (e.g. ethernet, modem, modem speed, duration of connection, connection cost, etc), the type of device connected (e.g. laptop computer, PDA, pen based system, cellular telephone, voiced based systems, etc), characteristics of the device connected (e.g. display type, operating system, processing power, memory, etc), the application being executed or requested and the user identification of the user. Collectively, this information makes up the operating environment of a user session. Based on all or part of the information about a user's operating environment, a centrally administered set of rules may be applied to customize the distribution of content modification functions so as to take advantage of the particular operating environment of a session.

For example, according to the present invention, policies may be established regarding network usage that the transmission of images may be limited to conserve network bandwidth, especially on slow and/or costly communication links. Alternatively, a policy could be established that images will be provided irrespective of network bandwidth usage. Along similar lines, policies could be established regarding preprocessing of data for differing device types, such as image transformations, and storage of such transformations at a server. Similarly, policies could be established regarding security, such that a document or a portion of a document may be marked as sensitive and the content could be sent based on the user's security classification. A policy could also be established regarding the distribution of business information over unsecured links, such as unencrypted wireless links. A policy could also be established regarding priorities, for example, an override policy could be established for certain users, such as executives or customers, such that requested content would be provided on a best efforts basis irrespective of other operating environment parameters.

In addition to determining the distribution of content tailoring based upon policies, rules may also be established, for example, for particular operating environment conditions. Thus, rules may be established such as removing images from content provided to devices with less than a 120×150 pixel display. Images may be transformed to black and white only if the connection to a device is through a wireless connection. Similarly, rules can be based on the type of message. For example, if a message is an e-mail do not modify the content. If the message is sent to a PDA then only display heading lines and enclose text with XML/HTML "special" tags.

As will be appreciated by those of skill in the art, the number of rules and policies will vary from organization to organization and may be customized based on a particular organization's requirements. Accordingly, while several examples of rules and policies have been provided herein to illustrate the present invention, the present invention should not be construed as limited to any particular set of rules or policies.

FIG. 1 illustrates a system 10 in which the present invention may be beneficially utilized. As seen in FIG. 1, a server 20 may be accessed from a number of differing data processing systems such as portable computers 22 and 22', desktop computer 23, PDA 24, pen based computer 26, cellular telephone 28, which may be smartphone or screenphone and satellite telephone 28' which may be a smartphone, screenphone or voice only telephone. These differing data processing systems 22, 22', 23, 24, 26, 28 and 28' may each have differing processing capabilities, data presentation capabilities, operating systems and/or applications which request information from server 20. Furthermore, each of these differing data processing systems 22, 22', 23, 24, 26, 28 and 28' may be utilized by different users with different preferences associated with the users. As will be appreciated by those of skill in the art, other types of processing systems may also benefit from utilization of the present invention.

The differing data processing systems 22, 22', 23, 24, 26, 28 and 28' may also utilize different communication techniques for communicating with server 20. For example, portable computer 22 and desktop computer 23 may utilize a network interface card to communicate with server 20 over a direct network connection.such as the Ethernet 38 illustrated in FIG. 1. Portable computer 22' may communicate directly with server 20 through modem 32 and modem 32'. PDA 24 is illustrated as communicating with server 20 through desktop computer 23. Similarly, pen based computer 26 may communicate through a modem 32" connection to the Internet or intranet 40. Cellular telephone 28 may communicate with server 20 through a cellular connection 36 and the Internet or intranet 40. Finally, telephone 28' may communicate with server 20 through a satellite connection 34 and the Internet or intranet 40.

Furthermore, as will be appreciated by those of skill in the art, the type of connection may change from session to session. Thus, for example, while portable computer 22' is illustrated as using a modem to modem direct connection to communicate with server 20, in a subsequent session, portable computer 22' could communicate with server 20 through a network connection, by for example, connection to Ethernet 38. As is seen from the examples in FIG. 1, data processing systems may communicate with a server using a wide variety of connection types with differing connection characteristics. Some connection types may be high speed, low cost, connections, such a the Ethernet connection 38, while others may be lower speed, higher cost, connections, such as the cellular connection 36 or lower speed, lower cost, connections such as through a modem 32.

As is further illustrated in FIG. 1, server 20 has access to a policy and rule repository 30. The policy and rule repository 30 may be incorporated in server 20 or may be accessible through a network or other communication connection. The policy and rule repository 30 may also be periodically downloaded or otherwise provided to server 20 and a copy of the policy and rule repository 30 maintained by server 20. The policy and rule repository 30 preferably includes policies and rules which define the distribution of content tailoring functions between the server 20 and a client such as the data processing systems 22, 22', 23, 24, 26, and 28 illustrated in FIG. 1. The policy and rule repository 30 may also include user preference information which may be used in determining a distribution of content tailoring functions between the server 20 and a client. While the policy and rule repository 30 is illustrated and described in the present application as a single database, as will be appreciated by those of skill in the art, multiple databases may be utilized.

In general, in a system according to the present invention, when an application executing on a client data processing system, such as one of data processing systems 22, 22', 23, 24, 26 and 28, initially establishes a connection or requests information from server 20, the client provides session specific information to server 20. Server 20 accesses the policy and rule repository 30 and, based on the policies and rules and the session specific information determines where any content modification or tailoring for the client should take place; in the client, in the server, in some other processor or in some combination. The server 20 then provides the requested information content to the client data processing system tailored as specified by the policies and rules and the session specific information. If any further tailoring is to be performed by the client data processing system, this tailoring of the content may be performed and the final tailored content may be utilized by the application executing on the client data processing system.

Thus, the present invention provides for the dynamic assignment of content tailoring functions between processing systems based on particular characteristics of a session. Such a dynamic assignment may provide higher efficiency in the utilization of resources in tailoring content to be provided to a client. As used herein, content tailoring refers to modifications to the form or substance of content provided to a client based on characteristics of a session with the client. For example, content provided to a smartphone with a limited viewing area and display resolution may be tailored by eliminating graphics and providing only text. As another example, content provided to a client with limited processing power may be tailored by decompressing compressed files prior to providing the file to the client. As a further example, content may be tailored based on the speed or cost of the communication connection with the client. Thus, the server may pass along compressed information to a client during a session where the connection is through a wireless connection such that the client would decompress the information, but the server would decompress the information if the connection is through a direct network connection. Similarly, image transformations, text content tailoring and translation of content to a voice markup language are further examples of content tailoring which may be utilized with the present invention.

Furthermore, because the connection type may change from session to session, the distribution of content tailoring may change from session to session. Thus, when PDA 24 is connected through satellite 34 the content tailoring may be distributed in a different manner than when PDA 24 is connected through Ethernet 38. Similarly, if a user utilizes both a portable computer, such as portable computer 22, and a PDA 24, then the distribution of content tailoring functions may differ when the user uses portable computer 22 or PDA 24.

Figure 2:
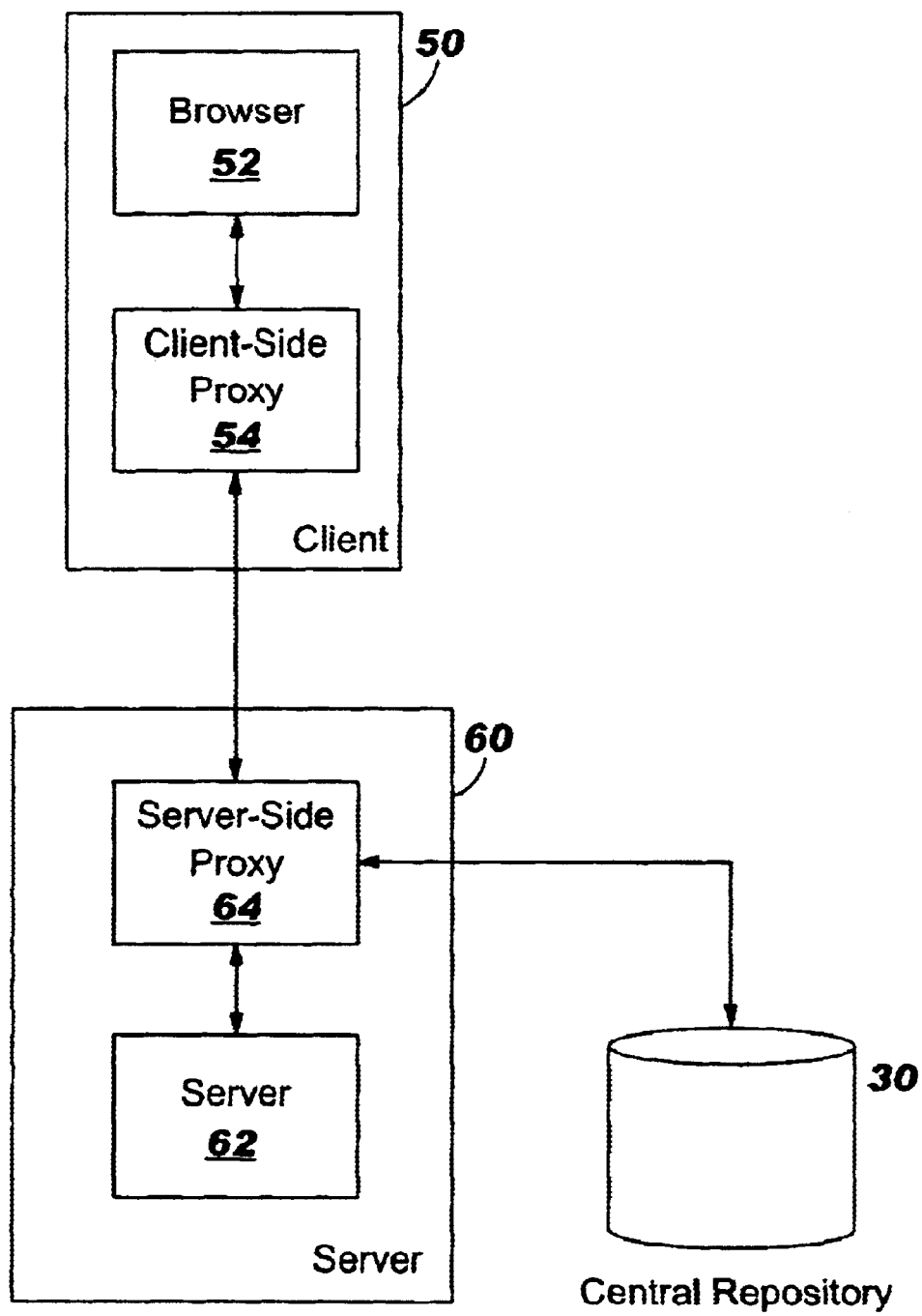
FIG. 2 is a block diagram of a particular embodiment of the present invention utilizing proxies.

FIG. 2 illustrates one embodiment of the present invention where the application executing on the client data processing system 50 is a browser application 52. In order to facilitate utilizing conventional browser applications, a client-side proxy 54 may be utilized to incorporate session specific information into requests sent to server data processing system 60. The client side proxy may be a stand alone program or may be an applet, "plug-in" or other program which is downloaded to the client data processing system 50 upon connection to a server data processing system 60 or has previously been cached or otherwise stored at the client data processing system. Furthermore, as will be appreciated by those of skill in the art, the operations described herein as carried out by the client-side proxy 54 may be incorporated into browser 52.

As is further seen in FIG. 2, the client-side proxy communicates with a server-side proxy 64 which may control the distribution of tailoring functions based on user preferences, policies and/or rules which may be maintained in the central repository 30. The server-side proxy 64 also obtains content to be provided to the client data processing system 50 from server application 62. As will be appreciated by those of skill in the art, the illustrated system of FIG. 2 is simplified for illustration purposes. Thus, for example, the content requested by the client data processing system 50 may be obtained from multiple servers on multiple server data processing systems. Furthermore, the connection between client data processing system 50 and server data processing system 60 need not be direct as is illustrated in FIG. 2.

The operations which occur at the client data processing system 50, which may be carried out by the client-side proxy 54 and the operations which occur at the server data processing system 60 which may be carried out by the server-side proxy 64 will now be described with respect to FIGS.

Figure 3:
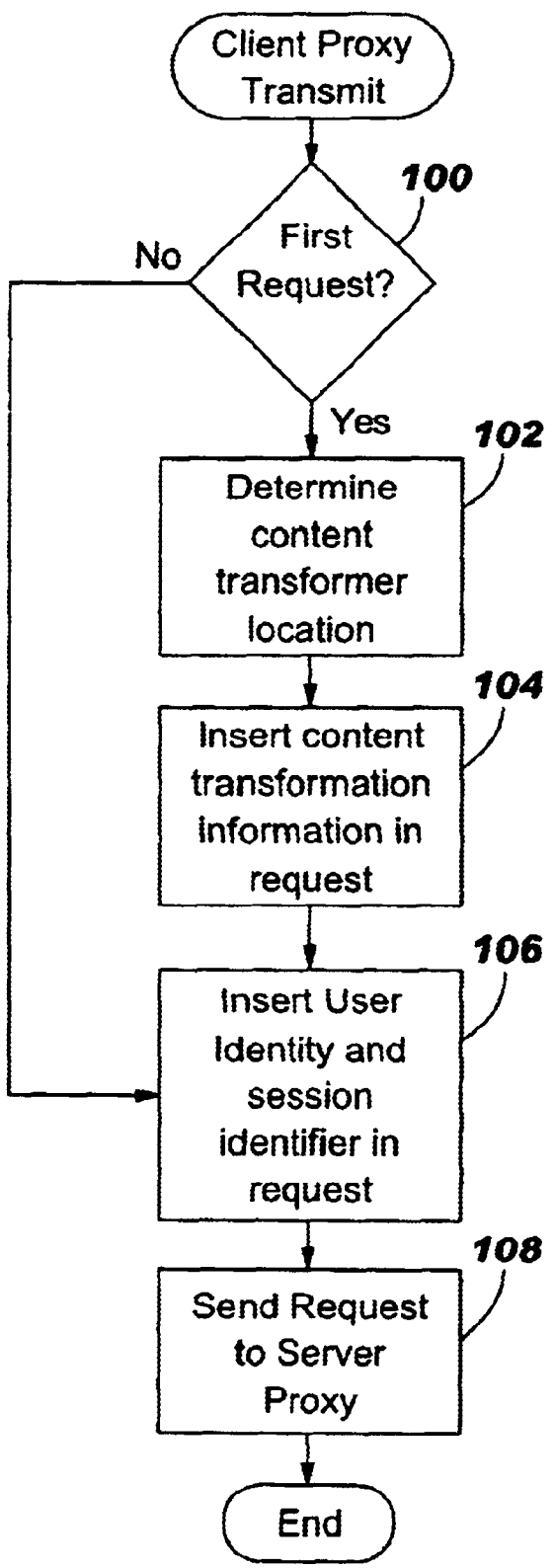
FIG. 3 is a flowchart illustrating operations of a client in transmitting requests to a server according to one embodiment of the present invention.

3 through 5. As seen in FIG. 3, when the browser 52 transmits a request, the client-side proxy 54 receives the request and determines if it is the first request for the current session (block 100). If the request is the first request, then it is determined if the client data processing system is capable of and has a preference for performing the content transformation or "tailoring" (i.e. should content tailoring occur at the client data processing system 50 or at another data processing system) (block 102). This information, along with other information about the client data processing system 50 and the session, such as for example, data processing capability, available memory, display type and size, resource availability, connection type, priorities for requested information, connection duration, or the like, is incorporated into the request (block 104). Client preferences and other session information (blocks 102 and 104) may reside at the client data processing system 50 or they may be obtained from a server during device initialization, at user logon or with each session. A user identification, such as a userid, may also be included in the request (block 106). The information added or otherwise contained in the request may collectively be referred to as "session specific information." After incorporating the session specific information in the request, the request is sent to the server-side proxy 64 (block 108).

Returning to block 100 of FIG. 3, if the request from the browser 52 is not the first request, then, if the server side stores the previously transmitted session specific information, the only information which would need to be inserted into the request is the user identification and a session identifier to indicate that the previously transmitted session specific information remains valid (block 106). The request with the inserted user identification would then be sent to the server-side proxy (block 108). However, if the server-side proxy 64 does not store information, the session specific information may be added to and sent with each request.

Figure 4:
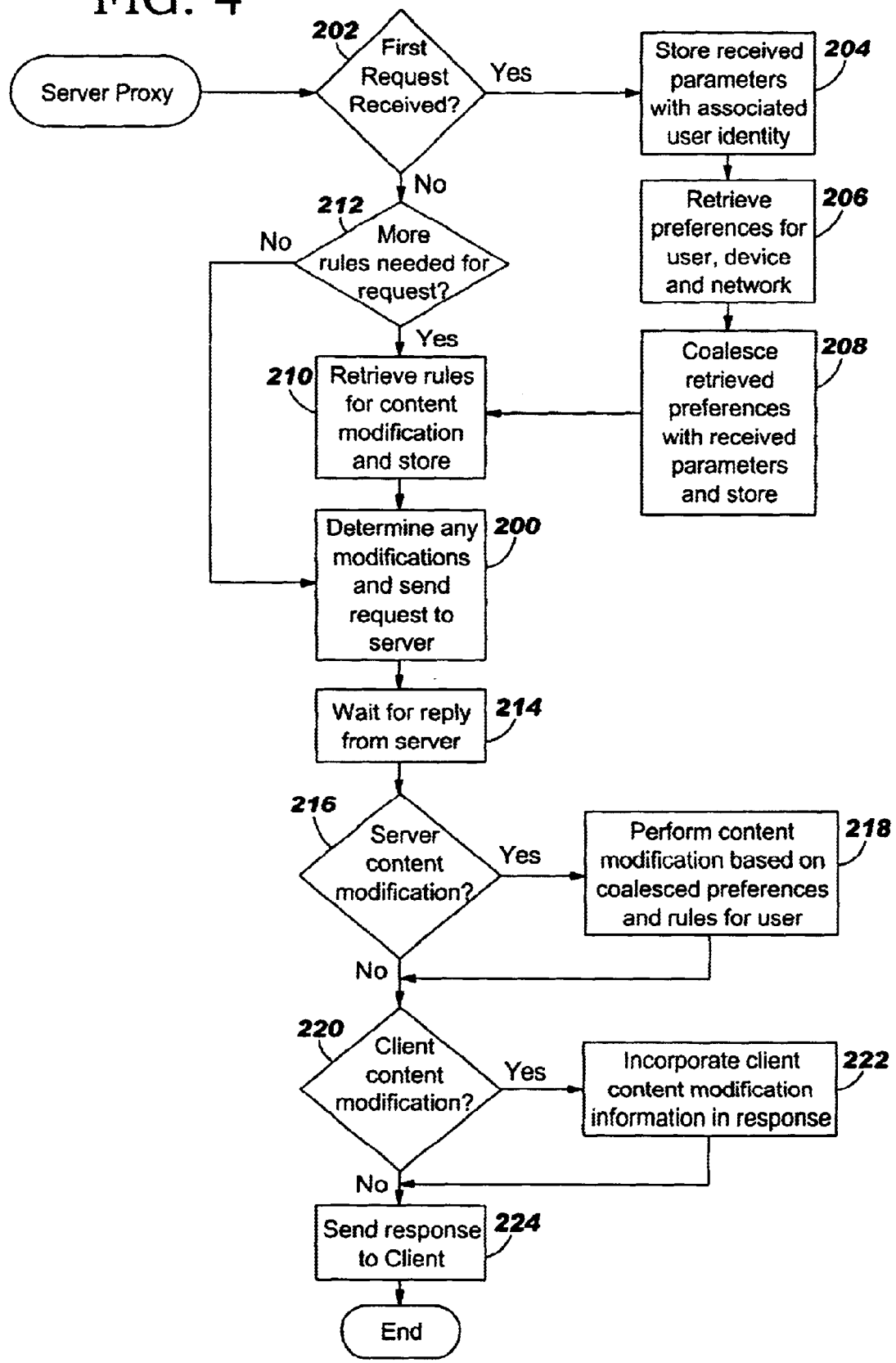
FIG. 4 is a flowchart illustrating operations of a server according to one embodiment of the present invention.

When the request is received from the client data processing system the operations of FIG. 4 may be carried out. As is seen in FIG. 4, when the request is received, the server-side proxy 64 determines if it is the first request received for the session from the client-side proxy 54 (block 202). If it is the first request received, then the received parameters (i.e. the session specific information) contained in the request is stored and associated with the user identification in the request (block 204). The server-side proxy 64 also accesses the central repository 30 to retrieve any user preferences associated with the user identification received in the request (block 206). Such user preferences may include, for example, preferences for content, such as the display of images, a home page and home page content, or the like, as well as formatting preferences, such as fonts, limiting displays to an initial screen or only displaying headings. These preferences are then coalesced with any parameters received from the client-side proxy 54 (block 208). The process of coalescing the preferences and received session specific information may involve determining any inconsistencies and selecting a particular preference if inconsistencies do arise. Otherwise, the process may involve determining a single set of preferences from the received session specific information and the obtained preferences.

Server-side proxy 64 also retrieves rules and/or policies for content modification from the central repository 30 (block 210). These rules and/or policies may be retrieved at the same time as the preferences are obtained or they may be retrieved before or after retrieving any preferences. The rules and/or policies and the preferences are stored by the server-side proxy 64 so as to avoid the necessity of retrieving the rules and/or policies and preferences for subsequent requests from the client during the same session (block 208 and block 210).

The server-side proxy 64 may then determine if the request should be modified or the server otherwise requested so that the server application 62 provides modified content in response to the request and provides the request to the server 62 (block 200). For example, the server-side proxy 64 could determine that text only responses are appropriate for the request and could modify the request or other server parameters such that the reply from the server was in text only format. It is then determined if the content to be provided to the client has been received by the server-side proxy 64 from the server 62 (block 214). If the reply to the request has not been received, then the server-side proxy 64 waits for the reply (block 214). However, if the reply has been received, then the server-side proxy 64 determines if content modification by the server has been specified by the policies, rules and/or the preferences (block 216). If content modification is specified to be carried out at the server, then the content is modified based on the coalesced preferences/received session specific information and the policies or rules for the user identification of the request (block 218).

Irrespective of whether content modification is to be performed at the server, the server-side proxy 64 also determines if content tailoring or modification is to be performed at the client (block 220). If content modification is to be performed at the client, then the server-side proxy 64 incorporates any information necessary for such modification, such as programs required, etc . . . , into the response to be provided to the client (block 222). The response is then sent to the client (block 224).

Returning to block 202, if the request is not the first request from the client, then it is determined if more rules are required for the specific request (block 212). More rules may be required if, for example, rules are associated with specific content requested or with changing operating environment conditions. If more rules are required, then the rules are retrieved and operations continue from block 210 as described above. However, if no more rules are required, then operations continue from block 200 as described above.

Figure 5:
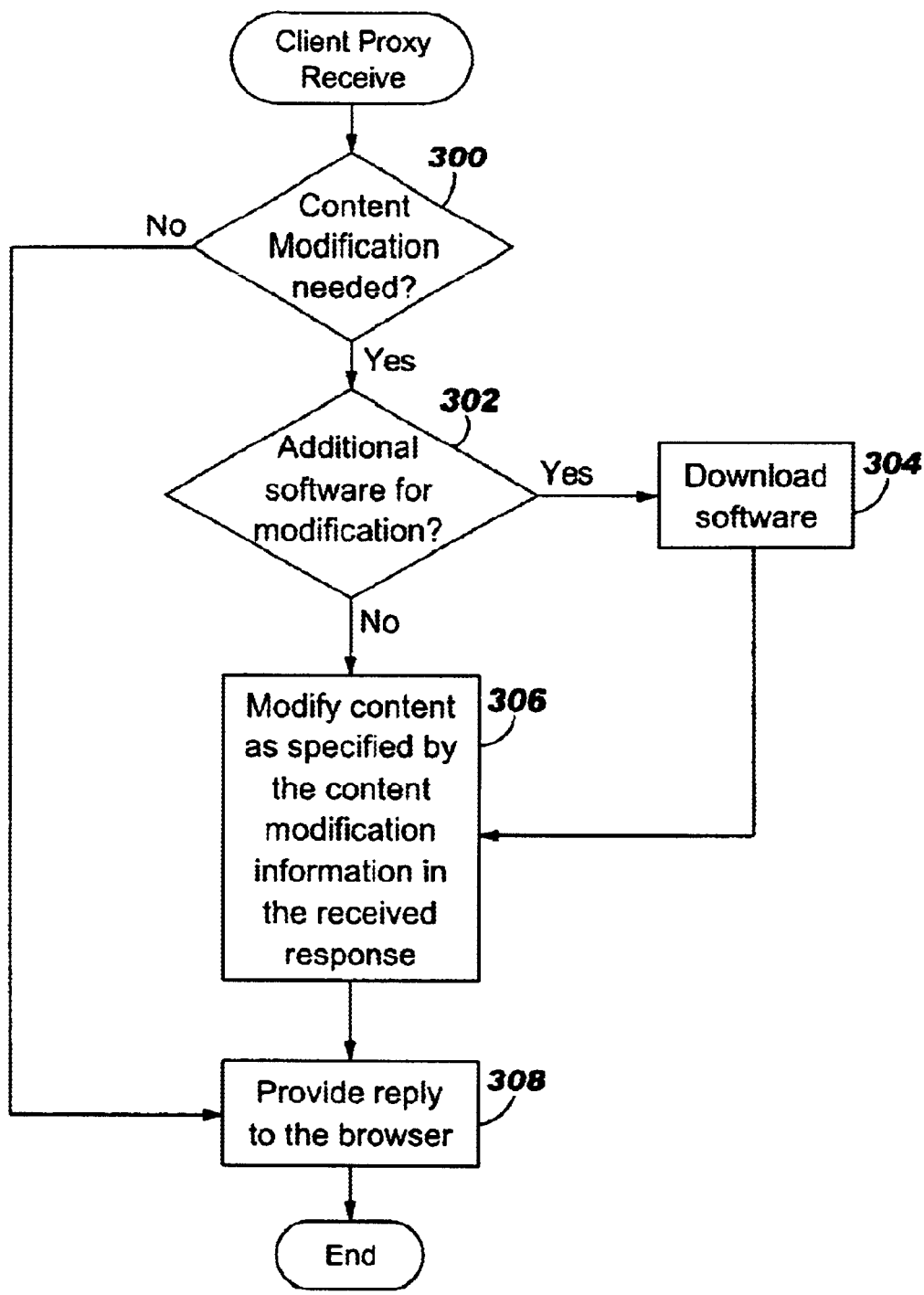
FIG. 5 is a flow chart illustrating operations of a client in receiving a reply according to one embodiment of the present invention.

When the client-side proxy 54 receives the reply from the server-side proxy 64, the operations of FIG. 5 are carried out. The client-side proxy 54 determines if content modification is to be carried out by the client (block 300). Such a determination may be made by inspecting the reply to determine if content modification information has been included with the reply. If no client modification of the content is required then the reply is provided to the browser 52 (block 308). However, if client modification is required by the client, then the client-side proxy 54 determines if additional software programs are required for the content modification (block 302). If additional software programs are required, then the software programs may be downloaded or otherwise acquired by the client-side proxy 54 (block 304). Irrespective of whether additional software programs are required, the client-side proxy modifies the content as specified by the content modification information in the reply to provide final tailored content for the browser 52 (block 306). This final tailored content is then provided to the browser 52 (block 308).

Thus, the present invention allows for the distribution of content modification (tailoring functions) between the client and the server. These distributions may be based on the predefined policies or rules, user preferences, as well as session specific information.

While the present invention has been described with respect to the addition of session specific information to requests initiated by a client, as will be appreciated by those of skill in the art, if such information is otherwise available, or if the information is not necessary to make decisions with respect to the policies or rules then such information need not be incorporated in requests. Furthermore, if a client does not have the ability to participate in distributed content tailoring, then the-server side proxy may make inferences about the client device and perform all the content tailoring that it determines is necessary. Alternatively, requests received by the server-side proxy from such clients could be passed through to the server and conventional content tailoring performed.

While the description of FIGS. 3 through 5 describes the coalescing of preferences, as will be appreciated by those of skill in the art, the preferences, the policies and/or rules, and the session specific information may be coalesced to provide a single definition for the distribution of content tailoring. Furthermore, while the operations illustrated in FIGS. 3 through 5 are illustrated in a particular sequence, as will be appreciated by those of skill in the art, the sequence of operations may be varied while still benefiting from the teachings of the present invention. Accordingly, the present invention should not be construed as limited to the particular sequence or sequences of operations illustrated in the flowchart illustrations.

Furthermore, while the present invention has generally been described with respect to static content, as will be appreciated by those of skill in the art, the present invention may be equally applicable to dynamic web content such as content created by server-side programs interfacing with backend databases and/or applications.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of tailoring content for a session of a first data processing system communicating with a second data processing system, comprising the steps of:
    obtaining session specific information from the first data processing system; and
    distributing tailoring functions between the first data processing system and the second data processing systems based upon the obtained session specific information, wherein the distributing step comprises the steps of:
        obtaining policies which control the distribution of tailoring functions between data processing systems based on session specific information;
        distributing tailoring functions between the first data processing system and the second data processing system according to the obtained policies and the session specific information.

2. A method according to claim 1, further comprising the steps of:
    defining the policies which control the distribution of tailoring functions between data processing systems;
    storing the defined policies in a policy repository accessible to the second data processing system; and
    wherein the step of obtaining policies comprises the step of obtaining policies from the policy repository.

3. A method according to claim 2, further comprising the steps of:
    storing user preferences associated with the distribution of content tailoring functions between the first data processing system and data processing systems other than the first data processing system in a preferences repository accessible to the second data processing system;
    obtaining the stored user preferences associated with a user of the first data processing system from the preferences repository;
    coalescing the session information, the obtained policies and the obtained user preferences so as to define a content tailoring distribution for the session; and
    wherein the step of distributing tailoring functions between the first data processing system and the second data processing system according to the obtained policies and the session specific information comprises distributing tailoring functions between the first data processing system and the second data processing system according to the defined content tailoring distribution for the session.

4. A method according to claim 2, wherein the session specific information comprises information associated with a preference of the first data processing system as to the allocation of content tailoring functions between the first data processing system and data processing systems other than the first data processing system.

5. A method according to claim 2, wherein the session specific information comprises at least one of an identification associated with a user of the first data processing system, hardware configuration information associated with the first data processing system, application information associated with an application executing on the first data processing system and operating system information associated with an operating system executing on the first data processing system.

6. A method according to claim 2, further comprising the steps of:
    tailoring content to be provided to the first data processing system, at the second data processing system according to a first content tailoring function specified by the obtained policies and the session specific information so as to provide first tailored content; and
    providing the first tailored content to the first data processing system.

7. A method according to claim 6, further comprising the step of tailoring the first tailored content provided to the first data processing system, at the first data processing system, according to a second content tailoring function specified by the obtained policies and the session specific information so as to provide final tailored content.

8. A method according to claim 1, further comprising the steps of:
    tailoring content to be provided to the first data processing system, at the second data processing system according to a first content tailoring function specified by the obtained session specific information so as to provide first tailored content; and providing the first tailored content to the first data processing system.

9. A method of tailoring content provided to a first data processing system communicating with a second data processing system, the method comprising the steps of:

transmitting a request for content from the first data processing system to the second data processing system, wherein the request for content provides information associated with the tailoring of content to be provided to the first data processing system;

obtaining, in response to receiving the request from the first data processing system at the second data processing system, policies associated with the tailoring of content provided to the first data processing system, wherein the policies are further associated with defining the distribution of functions for tailoring content to be provided to the first data processing system between the first data processing system and at least one data processing system other than the first data processing system;

obtaining the content requested by the received request;

tailoring the obtained content utilizing a first tailoring operation, at the at least one data processing system other than the first data processing system, wherein the first tailoring operation is based on the obtained policies and the information provided by the request;

providing the tailored content to the first data processing system; and tailoring the content provided to the first data processing system at the first data processing system based on the obtained policies and the information provided in the request.

10. A method according to claim 9, wherein the information associated with the tailoring of content includes a user identification associated with a user or the first data processing system, the method further comprising the steps of:

storing user preferences associated with the distribution of content tailoring functions between the first data processing system and data processing systems other than the first data processing system in a preferences repository accessible to the second data processing system;

obtaining the stored user preferences associated with the user of the first data processing system from the preferences repository; and wherein the step of tailoring the obtained content utilizing a first tailoring operation, comprises the step of tailoring the obtained content utilizing a first tailoring operation, wherein the first tailoring operation is based on the obtained policies, the obtained stored user preferences and the information provided by the request.

11. The method according to claim 10, further comprising the step of coalescing user preferences received from the first data processing system with at least one of the obtained policies and the obtained user preferences so as to define a content tailoring distribution for the first data processing system.

12. A method according to claim 9, further comprising the steps of:

incorporating client content tailoring information into the tailored content to be provided to the first data processing system;

wherein the step of providing the tailored content to the first data processing system, comprises the step of providing the tailored content with the incorporated client content tailoring information to the first data processing system; and wherein the step of tailoring the content provided to the first data processing system at the first data processing system based on the obtained policies and the information provided in the request, comprises the step of tailoring the content provided to the first data processing system at the first data processing system based on the client content tailoring information.

13. A method according to claim 12, wherein the client content tailoring information specifies a software program associated with the tailoring of content by the first data processing system, the method further comprising the steps of:

obtaining at the first data processing system the software program specified by the client content tailoring information; and executing the software program at the first data processing system.

14. A method according to claim 9, wherein the first data processing system is a pervasive computing device.

15. A method according to claim 9, wherein the first data processing system is selected from the group comprising portable computers and desktop computers.

16. A method according to claim 9, wherein the information associated with the tailoring of content comprises at least one of an identification associated with a user of the first data processing system, hardware configuration information associated with the first data processing system, application information associated with an application executing on the first data processing system and operating system information associated with an operating system executing on the first data processing system.

17. A system for tailoring content for a session of a first data processing system communicating with a second data processing system, comprising:

means for obtaining session specific information from the first data processing system; and means for distributing tailoring functions between the first data processing system and the second data processing systems based upon the obtained session specific information, wherein the means for distributing comprises:

means for obtaining policies which control the distribution of tailoring functions between data processing systems based on session specific information;

means for distributing tailoring functions between the first data processing system and the second data processing system according to the obtained policies and the session specific information.

18. A system according to claim 17, further comprising:

means for defining the policies which control the distribution of tailoring functions between data processing systems;

means for storing the defined policies in a policy repository accessible to the second data processing system; and wherein the means for obtaining policies comprises means for obtaining policies from the policy repository.

19. A system according to claim 18, further comprising:

means for storing user preferences associated with the distribution of content tailoring functions between the first data processing system and data processing systems other than the first data processing system in a preferences repository accessible to the second data processing system;

means for obtaining the stored user preferences associated with a user of the first data processing system from the preferences repository;

means for coalescing the session information, the obtained policies and the obtained user preferences so as to define a content tailoring distribution for the session; and wherein the means for distributing tailoring functions between the first data processing system and the second data processing system according to the obtained policies and the session specific information comprises means for distributing tailoring functions between the first data processing system and the second data processing system according to the defined content tailoring distribution for the session.

20. A system according to claim 18, wherein the session specific information comprises information associated with a preference of the first data processing system as to the allocation of content tailoring functions between the first data processing system and data processing systems other than the first data processing system.

21. A system according to claim 18, wherein the session specific information comprises at least one of an identification associated with a user of the first data processing system, hardware configuration information associated with the first data processing system, application information associated with an application executing on the first data processing system and operating system information associated with an operating system executing on the first data processing system.

22. A system according to claim 18, further comprising:

means for tailoring content to be provided to the first data processing system, at the second data processing system according to a first content tailoring function specified by the obtained policies and the session specific information so as to provide first tailored content; and means for providing the first tailored content to the first data processing system.

23. A system according to claim 22, further comprising means for tailoring the first tailored content provided to the first data processing system, at the first data processing system, according to a second content tailoring function specified by the obtained policies and the session specific information so as to provide final tailored content.

24. A system according to claim 17, further comprising:

means for tailoring content to be provided to the first data processing system, at the second data processing system according to a first content tailoring function specified by the obtained session specific information so as to provide first tailored content; and means for providing the first tailored content to the first data processing system.

25. A system for tailoring content provided to a first data processing system communicating with a second data processing system, comprising:

means for transmitting a request for content from the first data processing system to the second data processing system, wherein the request for content provides information associated with the tailoring of content to be provided to the first data processing system;

means for obtaining, in response to receiving the request from the first data processing system at the second data processing system, policies associated with the tailoring of content provided to the first data processing system, wherein the policies are further associated with defining the distribution of functions for tailoring content to be provided to the first data processing system between the first data processing system and at least one data processing system other than the first data processing system;

means for obtaining the content requested by the received request;

means for tailoring the obtained content utilizing a first tailoring operation, at the at least one data processing system other than the first data processing system, wherein the first tailoring operation is based on the obtained policies and the information provided by the request;

means for providing the tailored content to the first data processing system; and means for tailoring the content provided to the first data processing system at the first data processing system based on the obtained policies and the information provided in the request.

26. A system according to claim 25, wherein the information associated with the tailoring of content includes a user identification associated with a user or the first data processing system, the system further comprising:

means for storing user preferences associated with the distribution of content tailoring functions between the first data processing system and data processing systems other than the first data processing system in a preferences repository accessible to the second data processing system;

means for obtaining the stored user preferences associated with the user of the first data processing system from the preferences repository; and wherein the means for tailoring the obtained content utilizing a first tailoring operation, comprises means for tailoring the obtained content utilizing a first tailoring operation, wherein the first tailoring operation is based on the obtained policies, the obtained stored user preferences and the information provided by the request.

27. The system according to claim 26, further comprising means for coalescing user preferences received from the first data processing system with at least one of the obtained policies and the obtained user preferences so as to define a content tailoring distribution for the first data processing system.

28. A system according to claim 25, further comprising:

means for incorporating client content tailoring information into the tailored content to be provided to the first data processing system;

wherein the means for providing the tailored content to the first data processing system, comprises means for providing the tailored content with the incorporated client content tailoring information to the first data processing system; and wherein the means for tailoring the content provided to the first data processing system at the first data processing system based on the obtained policies and the information provided in the request, comprises means for tailoring the content provided to the first data processing system at the first data processing system based on the client content tailoring information.

29. A system according to claim 28, wherein the client content tailoring information specifies a software program associated with the tailoring of content by the first data processing system, the system further comprising:

means for obtaining at the first data processing system the software program specified by the client content tailoring information; and means for executing the software program at the first data processing system.

30. A system according to claim 25, wherein the first data processing system is a pervasive computing device.

31. A system according to claim 25, wherein the first data processing system is selected from the group comprising portable computers and desktop computers.

32. A system according to claim 25, wherein the information associated with the tailoring of content comprises at least one of an identification associated with a user of the first data processing system, hardware configuration information associated with the first data processing system, application information associated with an application executing on the first data processing system and operating system information associated with an operating system executing on the first data processing system.

33. A computer program product for tailoring content for a session of a first data processing system communicating with a second data processing system, comprising:
   a computer readable storage medium having computer readable program code means embodied in said medium, said computer readable program code means comprising:
      computer-readable program code means for obtaining session specific information from the first data processing system; and
      computer-readable program code means for distributing tailoring functions between the first data processing system and the second data processing systems based upon the obtained session specific information, wherein the computer-readable program code means for distributing comprises:
         computer-readable program code means for obtaining policies which control the distribution of tailoring functions between data processing systems based on session specific information;
         computer-readable program code means for distributing tailoring functions between the first data processing system and the second data processing system according to the obtained policies and the session specific information.

34. A computer program product according to claim 33, further comprising:
   computer-readable program code means for defining the policies which control the distribution of tailoring functions between data processing systems;
   computer-readable program code means for storing the defined policies in a policy repository accessible to the second data processing system; and
   wherein the computer-readable program code means for obtaining policies comprises computer-readable program code means for obtaining policies from the policy repository.

35. A computer program product according to claim 34, further comprising:
   computer-readable program code means for storing user preferences associated with the distribution of content tailoring functions between the first data processing system and data processing systems other than the first data processing system in a preferences repository accessible to the second data processing system;
   computer-readable program code means for obtaining the stored user preferences associated with a user of the first data processing system from the preferences repository;
   computer-readable program code means for coalescing the session information, the obtained policies and the obtained user preferences so as to define a content tailoring distribution for the session; and
   wherein the computer-readable program code means for distributing tailoring functions between the first data processing system and the second data processing system according to the obtained policies and the session specific information comprises computer-readable program code means for distributing tailoring functions between the first data processing system and the second data processing system according to the defined content tailoring distribution for the session.

36. A computer program product according to claim 34, wherein the session specific information comprises information associated with a preference of the first data processing system as to the allocation of content tailoring functions between the first data processing system and data processing systems other than the first data processing system.

37. A computer program product according to claim 34, wherein the session specific information comprises at least one of an identification associated with a user of the first data processing system, hardware configuration information associated with the first data processing system, application information associated with an application executing on the first data processing system and operating system information associated with an operating system executing on the first data processing system.

38. A computer program product according to claim 34, further comprising:
   computer-readable program code means for tailoring content to be provided to the first data processing system, at the second data processing system according to a first content tailoring function specified by the obtained policies and the session specific information so as to provide first tailored content; and
   computer-readable program code means for providing the first tailored content to the first data processing system.

39. A computer program product according to claim 38, further comprising computer-readable program code means for tailoring the first tailored content provided to the first data processing system, at the first data processing system, according to a second content tailoring function specified by the obtained policies and the session specific information so as to provide final tailored content.

40. A computer program product according to claim 33, further comprising:
   computer-readable program code means for tailoring content to be provided to the first data processing system, at the second data processing system according to a first content tailoring function specified by the obtained session specific information so as to provide first tailored content; and
   computer-readable program code means for providing the first tailored content to the first data processing system.

41. A computer program product for tailoring content provided to a first data processing system communicating with a second data processing system, comprising:
   a computer readable storage medium having computer readable program code means embodied in said medium, said computer readable program code means comprising:
      computer-readable program code means for transmitting a request for content from the first data processing system to the second data processing system, wherein the request for content provides information associated with the tailoring of content to be provided to the first data processing system;

computer-readable program code means for obtaining, in response to receiving the request from the first data processing system at the second data processing system, policies associated with the tailoring of content provided to the first data processing system, wherein the policies are further associated with defining the distribution of functions for tailoring content to be provided to the first data processing system between the first data processing system and at least one data processing system other than the first data processing system;

computer-readable program code means for obtaining the content requested by the received request;

computer-readable program code means for tailoring the obtained content utilizing a first tailoring operation, at the at least one data processing system other than the first data processing system, wherein the first tailoring operation is based on the obtained policies and the information provided by the request;

computer-readable program code means for providing the tailored content to the first data processing system; and computer-readable program code means for tailoring the content provided to the first data processing system at the first data processing system based on the obtained policies and the information provided in the request.

42. A computer program product according to claim 41, wherein the information associated with the tailoring of content includes a user identification associated with a user or the first data processing system, the computer program product further comprising:

computer-readable program code means for storing user preferences associated with the distribution of content tailoring functions between the first data processing system and data processing systems other than the first data processing system in a preferences repository accessible to the second data processing system;

computer-readable program code means for obtaining the stored user preferences associated with the user of the first data processing system from the preferences repository; and wherein the computer-readable program code means for tailoring the obtained content utilizing a first tailoring operation, comprises computer-readable program code means for tailoring the obtained content utilizing a first tailoring operation, wherein the first tailoring operation is based on the obtained policies, the obtained stored user preferences and the information provided by the request.

43. The computer program product according to claim 42, further comprising computer-readable program code means for coalescing user preferences received from the first data processing system with at least one of the obtained policies and the obtained user preferences so as to define a content tailoring distribution for the first data processing system.

44. A computer program product according to claim 41, further comprising:

computer-readable program code means for incorporating client content tailoring information into the tailored content to be provided to the first data processing system;

wherein the computer-readable program code means for providing the tailored content to the first data processing system, comprises computer-readable program code means for providing the tailored content with the incorporated client content tailoring information to the first data processing system; and wherein the computer-readable program code means for tailoring the content provided to the first data processing system at the first data processing system based on the obtained policies and the information provided in the request, comprises computer-readable program code means for tailoring the content provided to the first data processing system at the first data processing system based on the client content tailoring information.

45. A computer program product according to claim 44, wherein the client content tailoring information specifies a software program associated with the tailoring of content by the first data processing system, the computer program product further comprising:

computer-readable program code means for obtaining at the first data processing system the software program specified by the client content tailoring information; and computer-readable program code means for executing the software program at the first data processing system.

46. A computer program product according to claim 41, wherein the information associated with the tailoring of content comprises at least one of an identification associated with a user of the first data processing system, hardware configuration information associated with the first data processing system, application information associated with an application executing on the first data processing system and operating system information associated with an operating system executing on the first data processing system.

* * * * *